Figure 1:
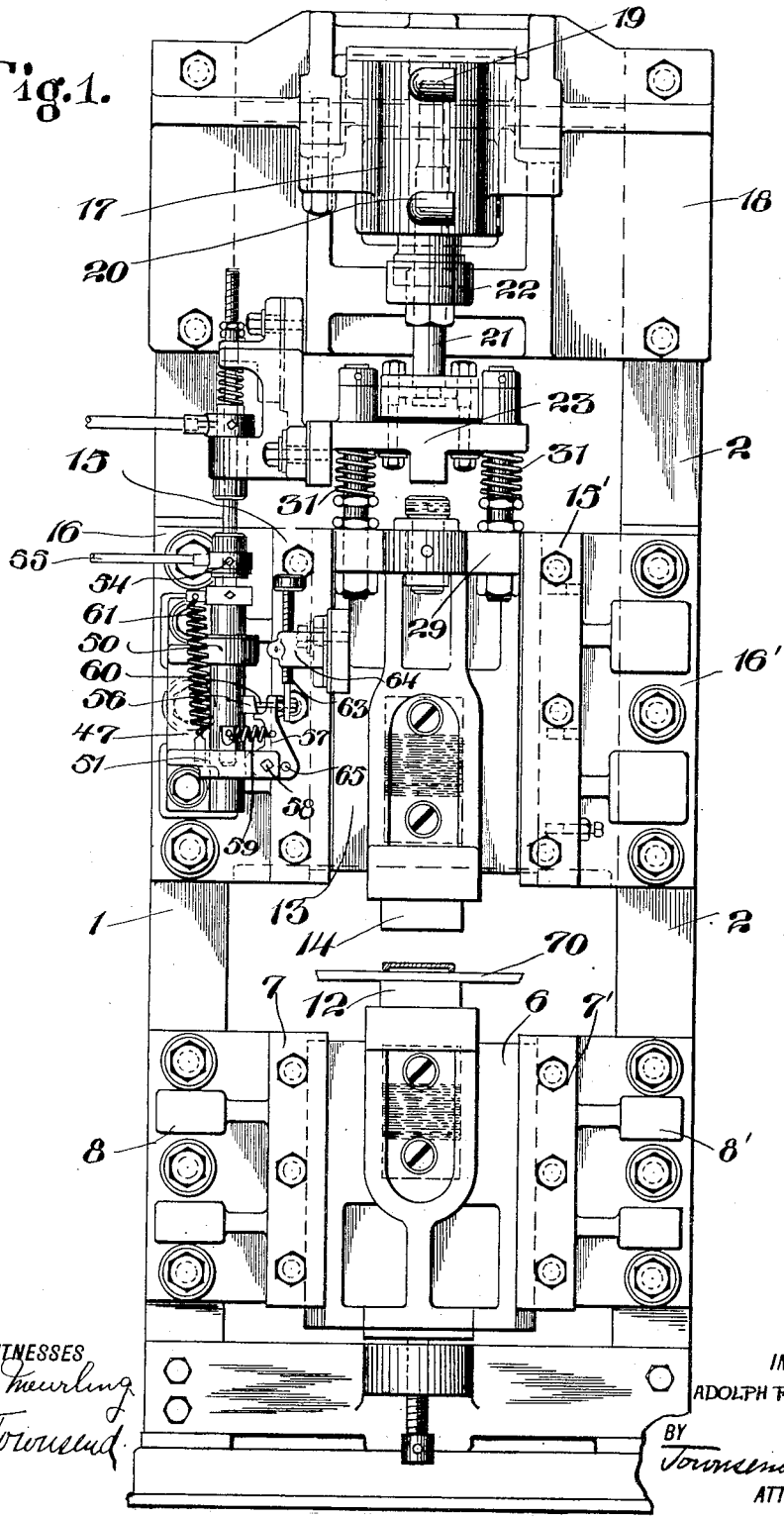

A. F. RIETZEL.
ELECTRIC METAL WORKING APPARATUS.
APPLICATION FILED AUG. 29, 1911.

1,174,446.

Patented Mar. 7, 1916.
7 SHEETS—SHEET 1.

WITNESSES
Erik Meurling
F. B. Townsend

INVENTOR
ADOLPH F. RIETZEL.
BY
Townsend & Decker
ATTORNEYS

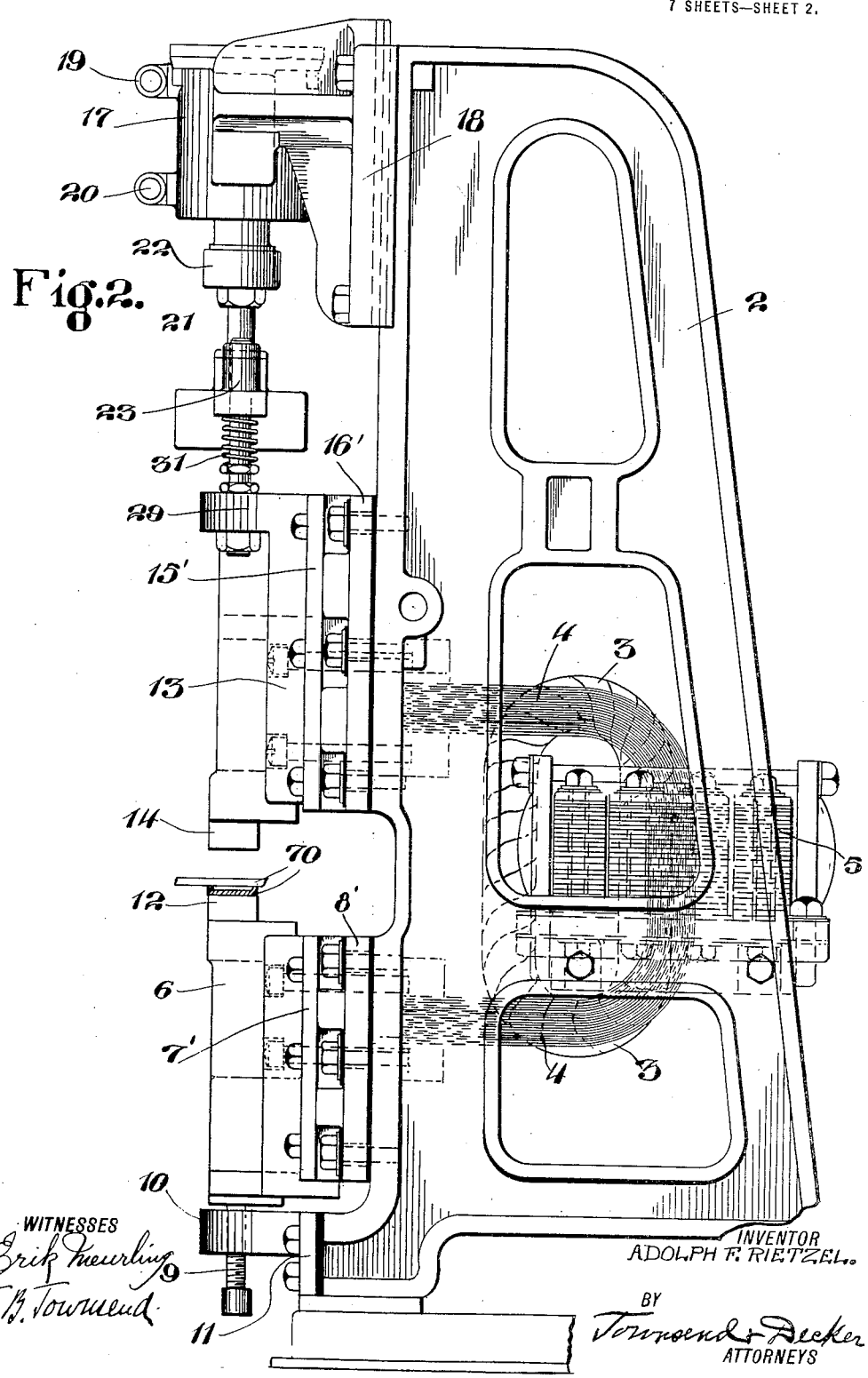

A. F. RIETZEL.
ELECTRIC METAL WORKING APPARATUS.
APPLICATION FILED AUG. 29, 1911.
1,174,446.
Patented Mar. 7, 1916.
7 SHEETS—SHEET 3.
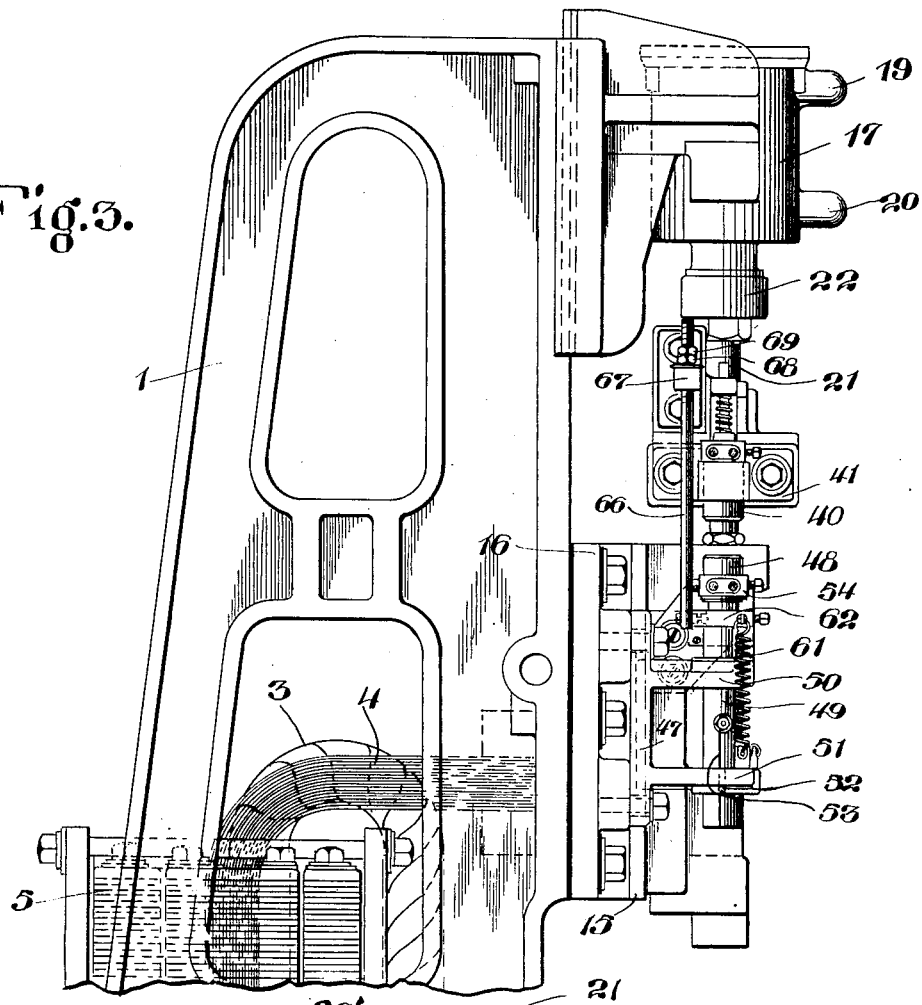
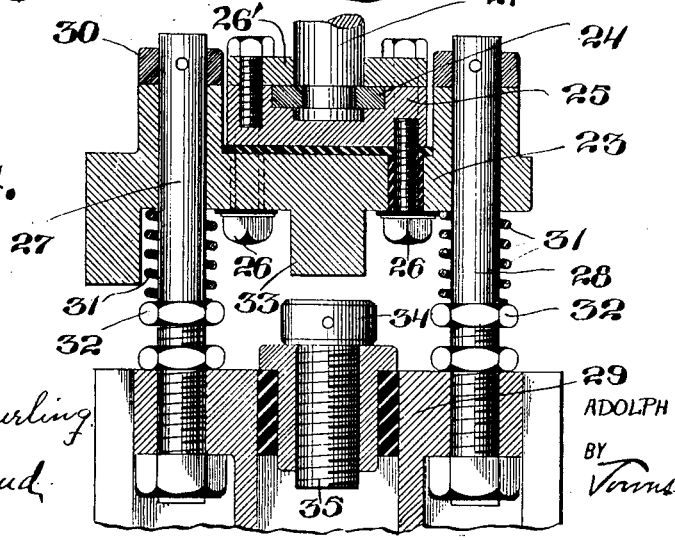
WITNESSES
Erik Meurling
F. B. Townsend
INVENTOR
ADOLPH F. RIETZEL.
BY
Townsend & Decker
ATTORNEYS

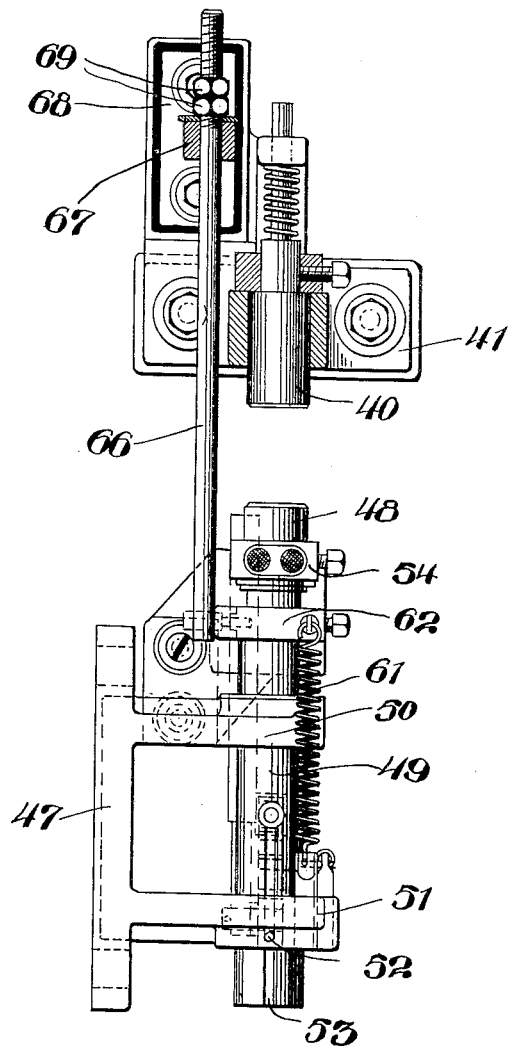

A. F. RIETZEL.
ELECTRIC METAL WORKING APPARATUS.
APPLICATION FILED AUG. 29, 1911.
1,174,446.
Patented Mar. 7, 1916.
7 SHEETS—SHEET 5.
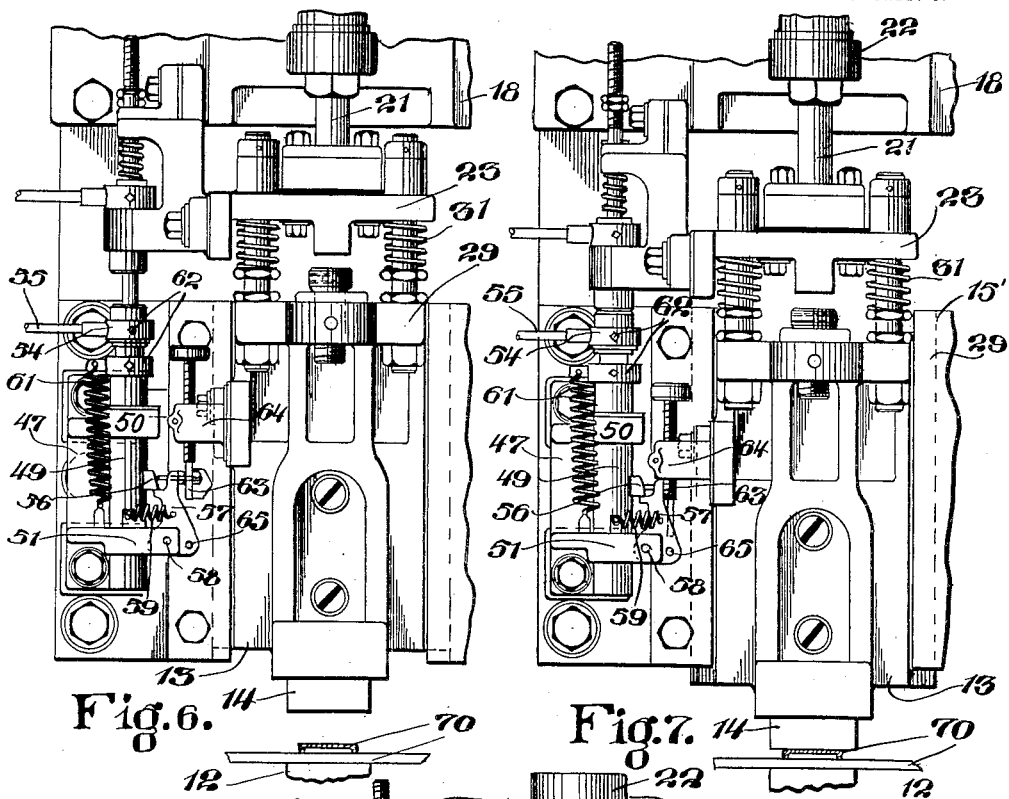
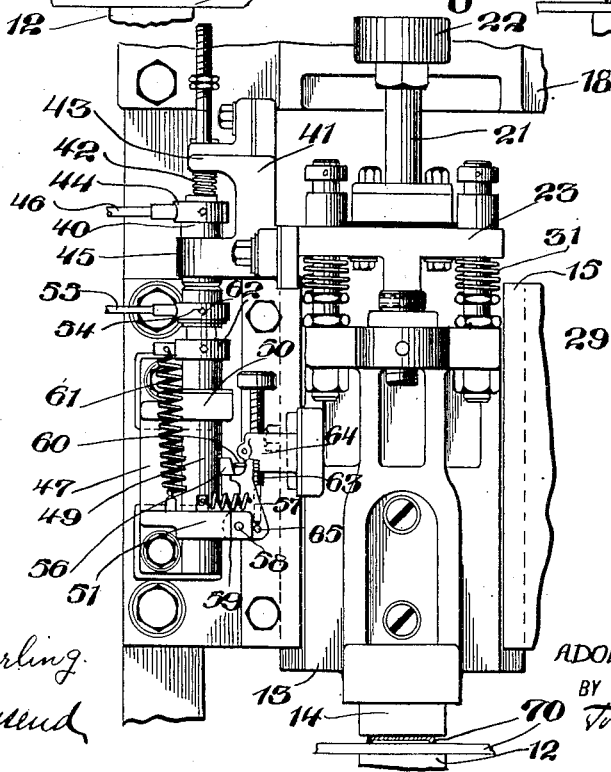
WITNESSES
Erik Meurling
F. B. Townsend
INVENTOR
ADOLPH F. RIETZEL.
BY
Townsend & Decker
ATTORNEYS

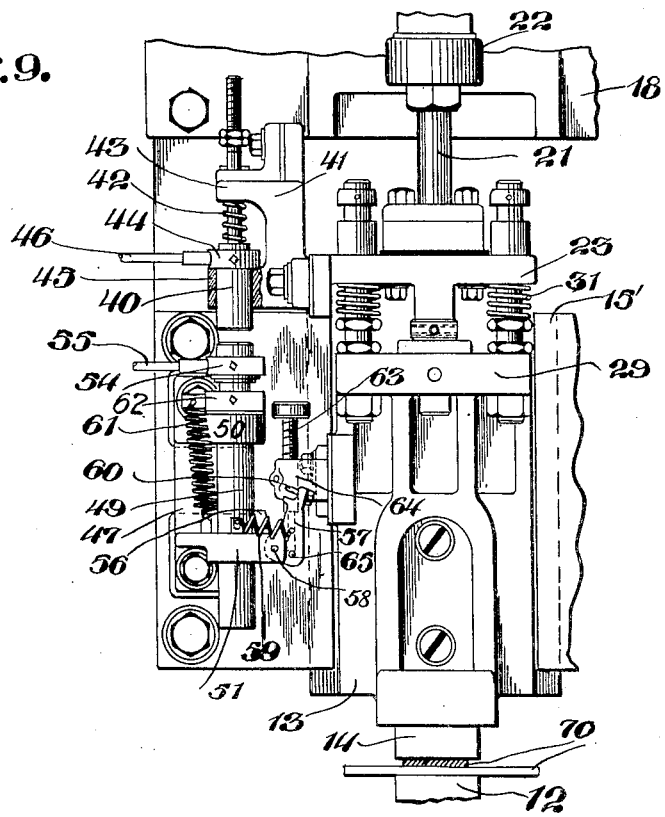
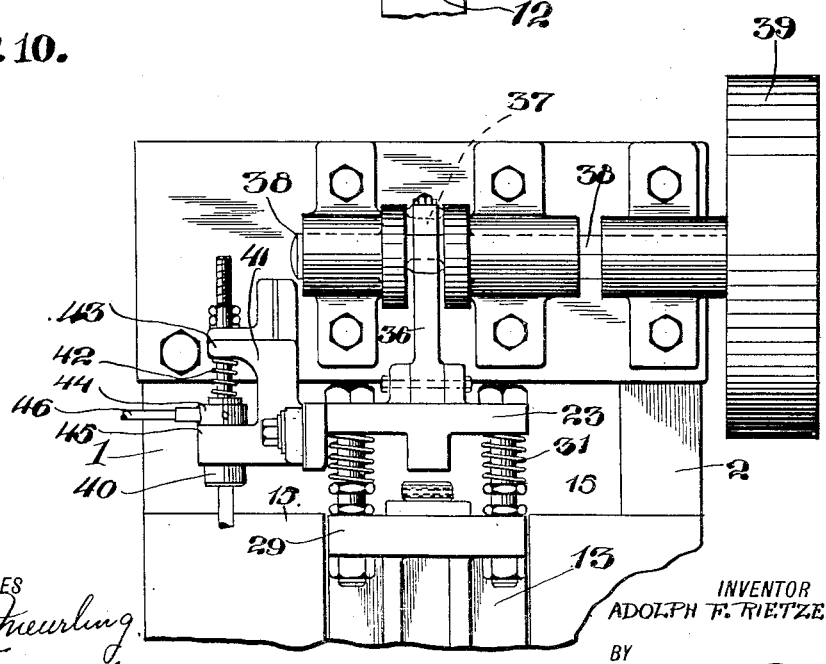

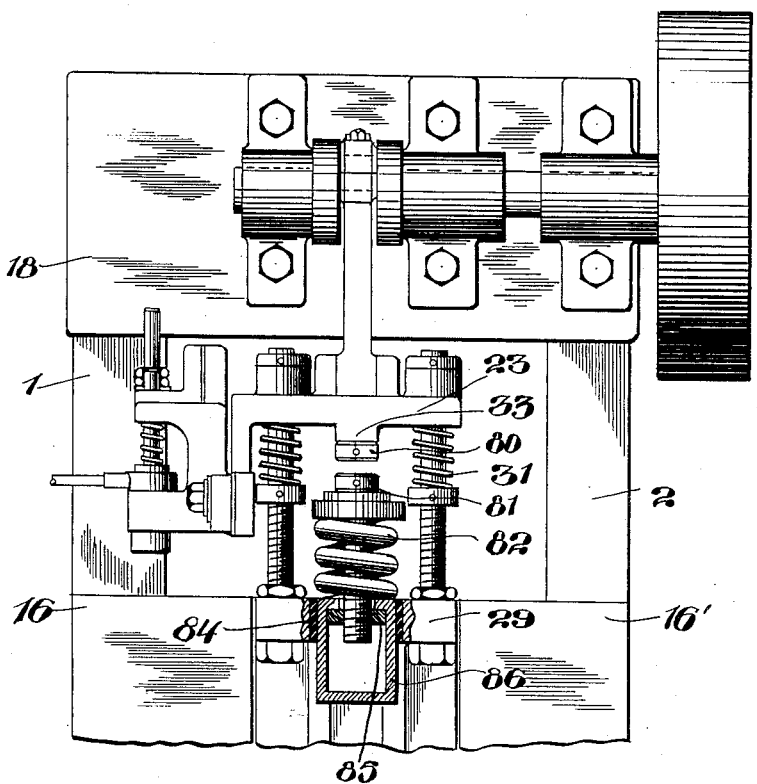

UNITED STATES PATENT OFFICE.

ADOLPH F. RIETZEL, OF CHARLESTOWN, RHODE ISLAND, ASSIGNOR TO THOMSON ELECTRIC WELDING COMPANY, OF LYNN, MASSACHUSETTS, A CORPORATION OF MASSACHUSETTS.

ELECTRIC METAL-WORKING APPARATUS.

1,174,446.  Specification of Letters Patent.  Patented Mar. 7, 1916.

Application filed August 29, 1911. Serial No. 646,742.

*To all whom it may concern:*

Be it known that I, ADOLPH F. RIETZEL, a citizen of the United States, and a resident of Charlestown, in the county of Washington and State of Rhode Island, have invented certain new and useful Improvements in Electric Metal-Working Apparatus, of which the following is a specification.

My present invention relates to that class of metal working apparatus in which provision is made for heating the work by an electric current conveyed through the same by suitable electric contacts engaging it and in which provision is also made for applying pressure to the work through the action of suitable work engaging slides.

The main object of the invention is to simulate by automatic means in an electric metal working machine the procedure or method of operation practised by a skilled operator in making a weld or otherwise working the material. For instance, in welding two pieces of metal together by the passage of an electric heating current and the application of pressure to the heated section, a skilled operator first feels or "nurses" the work, that is, as the work softens he applies a comparatively light periodic pressure and when the work has reached the welding temperature he applies a sudden very heavy upsetting pressure to jam the parts together. By this invention the above procedure is followed, as far as practicable, by mechanical means automatically actuated, whereby an automatic machine is capable of making more perfect welds than heretofore.

Another object of the invention is to provide improved means for controlling the flow of heating current through the work and incident to this end but one circuit controlling device is employed to both start and automatically break the flow of current.

The invention consists in the novel parts, combinations of parts and manner of operation as well as in the details of construction hereinafter more particularly described and then specified in the claims.

While the invention is shown and described as embodied in a machine constructed and organized especially for the purpose of welding flat stock having projecting portions, it will be understood that by suitably modifying the form of the work engaging elements and other details the invention is applicable for use for other purposes and for welding and otherwise working other styles of metallic material.

In the accompanying drawings, Figure 1 is a front elevation of an electric welding machine constructed in accordance with the preferred manner of carrying this invention into effect. Fig. 2 is a side elevation of the same looking at the right side of the machine. Fig. 3 is a similar elevation of the upper part of the left side of the machine. Fig. 4 is an enlarged section through the pressure applying devices which simulate hand welding. Fig. 5 is an enlarged side elevation of the current controlling devices detached from the machine. Fig. 6 is a detached front elevation of the pressure and current controlling devices in their initial position. Fig. 7 is a similar view showing the parts in the positions taken when the contacts have gripped the work and the current has started to flow. Fig. 8 is a similar view showing the parts in position with direct mechanical pressure applied. Fig. 9 is a similar view showing the parts in position at the completion of the weld and the circuit broken. Fig. 10 is a front elevation of the upper part of the machine illustrating an alternative manner of pressure-slide actuating mechanism. Fig. 11 is a similar elevation illustrating a modification in the pressure applying devices.

The main framework of the machine which supports the various operating mechanisms comprises two side frames 1, 2 of any suitable construction.

The source of electric energy adapted to supply heating current to the work may be of any desired type, but is here shown as a transformer provided with a flexible secondary such as is well known in the art. The transformer is suitably secured to but insulated from the frames 1, 2 and is disposed at the rear of the machine as shown. The transformer consists of a primary 3 and a flexible secondary 4 constructed preferably of a number of thin copper laminations to the ends of which are secured the electrodes by means of which current is fed to the work. The laminated core for the transformer is indicated at 5.

6 indicates one of the current carrying blocks or electrodes to the rear face of which one of the terminals of the transformer secondary 4 is suitably secured. This block or electrode is, during the operation of the machine in welding, preferably stationary but is mounted in suitable guides 7, 7' formed on plates 8, 8' secured to but insulated from the side frames 1 and 2 respectively. The electrode 6 supports the work to be welded and is adjustable vertically in its guides by an adjusting screw 9 working in a boss 10 projecting from a bracket 11 mounted upon the frames 1 and 2. The electrode 6 is provided with a work engaging contact 12 which is removable and replaceable as is usual to allow it to conform to the different styles of the work operated upon and to allow for wear.

The coöperating or upper current carrying block or electrode is typified as a slide 13 movable toward and from the stationary electrode 6 to grip the work between them, said electrode 13 being also provided with a work engaging removable and replaceable contact 14 as is the usual practice. The slide 13 is reciprocated by mechanism to be presently described and travels in guides 15, 15' suitably formed in plates 16, 16' secured to but insulated from the side frames 1 and 2 respectively of the machine. The other terminal of the flexible secondary 4 is secured to the rear face of the slide or electrode 13 in any suitable manner.

The reciprocation of the electrode or slide 13 may be effected in any desired manner as for instance as shown in Fig. 1 by means of hydraulic power applied through the medium of a hydraulic cylinder 17 secured to a cross plate 18 mounted on the side frames of the machine and provided with the alternate admission and exhaust ports 19 and 20. The power is supplied to the cylinder 17 in any well-known or desired manner and forming no part of the present invention will not be further described in detail, it being understood that the admission of fluid to either end of the cylinder causes the piston therein to reciprocate and at the same time causes reciprocation of the slide 13 through the improved mechanism now to be described.

Referring more particularly to Figs. 1 and 4, 21 indicates the piston rod projecting through a stuffing box 22 in the lower end of the cylinder 17 and having its free end connected in any suitable manner to a head 23 but preferably insulated therefrom. Preferably although not necessarily the connection between the piston rod 21 and the head 23 is effected by means of a split ring 24 seated in a pocket formed in a block 25 and which ring engages the free end of the piston rod 21 in a circumferential groove formed therein. The ring 24 is held to the block 25 by a plate 26' bolted thereto and through which plate the piston rod passes. The block 25 is secured to the head 23 by bolts 26 and insulated therefrom by suitable insulating sheets, washers and bushings as shown.

The head 23 is loosely connected to the slide 13 by a pair of connecting rods 27, 28 rigidly fastened at one end to a projection or boss 29 emanating from the face of the slide 13. The rods 27 and 28 pass loosely through the head 23 at either side thereof and at their upper ends have a collar 30 pinned to the rods.

31 indicates springs on the connecting rods 27 and 28, held under compression between the lower side of the head 23 and the boss 29 of the slide 13, nuts 32 being provided on the rods to vary the amount of energy initially stored in the springs 31.

The head 23 is capable of movement independent of the slide 13, the head sliding freely on the rods 27, 28 when pressure is applied thereto to force it downward, the springs 31 being further compressed and the slide descending on the work due to the weight of its parts and the force of the springs 31. On actuating the piston in the cylinder 17 in the reverse direction the head 23 engages the collars 30 on the connecting rods and raises the slide 13 in an obvious manner.

33 indicates a projection or lug depending from the head 23 and carried thereby. Said projection or lug is directly over and adapted to strike, when the head 23 has traveled a sufficient distance relative to the slide 13, the top of an adjustable nut 34 projecting upward from the top of the slide 13. When the parts have made such contact, pressure from the cylinder 17 or from any other suitable actuating power is applied from the head 23 direct to the slide 13 and not through the medium of the springs 31. The nut 34 can be dispensed with if desired and the contact be made with the top of the slide direct but it is preferable to employ such device or a similar one as by its adjustment the time of establishing direct connection between the head 23 and slide 13 can be varied to suit different conditions. The nut 34 is preferably provided with a screw shank 35 which is secured to but insulated from the slide 13 in any suitable manner, it being preferably secured to the boss 29.

The slide 13 is brought down on the work supported on the lower electrode block 6 by, as above stated, the weight of its parts and the pressure of the springs 31 when the piston in the cylinder 17 has been actuated to force the head 23 downward. The slide moves down until it engages the work when it temporarily comes to rest, the head 23 continuing to travel down and compress the springs 31 which apply pressure to the work as it softens. The slide 13 travels but a short distance and comparatively slowly under pressure of the springs after it engages the work and the head 23 continuing to travel under pressure of the operating power moves relatively considerably faster until at a predetermined point the depending lug 33 engages the nut 34 and the pressure of the springs 31 is cut out and the pressure of the cylinder 17, which necessarily is considerably greater, is applied direct to the slide 13 through the head 23. By these means a very heavy pressure is sharply and suddenly applied to the work when it has softened, due to passage of the heating current, to a desired extent, the time of application of this pressure being adjustable by nut 34.

It will be understood that my invention is not limited to operating the machine by hydraulic power as any suitable means may be employed, another form being illustrated in Fig. 10 in which the head 23 and slide 13 are reciprocated by a pitman 36 connected to an eccentric 37 provided on a rotary shaft 38 suitably mounted at the top of the frame of the machine, 39 indicating a pulley which might be used to rotate the shaft. The slide 13 is actuated from the head 23 as previously described.

The means for controlling the flow of heating current through the work will now be described.

As is the usual practice well known in the art the circuit controller is preferably located in the primary circuit of the transformer and by completing and breaking the primary circuit the flow of current through the secondary and the work in the machine between the electrodes is started and stopped respectively.

40 indicates one of the contacts of the circuit controller. The contact 40 is mounted in a bracket 41 secured to but insulated from the head 23, said bracket being carried by said head in its movements. Said contact is loosely mounted in an arm 45 of the bracket 41 and is backed up by a coil spring 42 compressed between a shoulder on the shank of the contact and an arm or lug 43 projecting from the bracket. The spring normally keeps the contact in its extended position projecting below the arm 45, a collar 44 fast on the contact shank limiting the downward movement of the contact by butting against the upper surface of the arm 45. The collar 44 also forms the binding post to which the circuit wire 46 is attached.

47 indicates a bracket secured to but insulated from a fixed part of the frame of the machine as for instance the plate 16.

48 indicates the coöperating contact of the circuit controller and is provided with an elongated shank 49 mounted to slide in arms 50, 51 of the bracket 47, it being prevented from turning by a pin 52 secured to the arm 51 which works in a slot 53 in the shank 49. The contact 48 is mounted directly below the contact 40 and is provided with a collar 54 fixedly secured thereto and forming the binding post to which the circuit wire 55 is attached.

The contact or switch member 48 is normally held in its uppermost position by a catch 56 secured to the contact shank 49 being held by a latch 57 pivotally mounted at 58 on the fixed bracket arm 51. The free end of the latch is normally pulled toward the contact shank 49 by a spring 59, an adjustable stop 60 limiting the amount the latch engages and holds the catch 56. When the catch 56 is freed by tripping the latch 57 the contact 48 is drawn sharply downward by a spring 61 normally held under tension between the fixed bracket arm 51 and a collar 62 fixed to the contact shank 49. The downward movement of the contact is limited by the collar 62 striking the fixed bracket arm 50.

The latch 57 is tripped during the downward travel of the slide 13 by an adjustable tripping finger 63 adjustably mounted in a bracket 64 secured to the slide 13 and traveling therewith. The lower end of the tripping finger strikes, when the slide has traveled a predetermined extent, a pin 65 projecting laterally from the side of the latch 57 and swings said latch about its pivot and releases the catch 56 therefrom.

66 indicates a rod secured at its lower end to the collar 62 fixed to the contact shank 49. Said rod passes upward and loosely through an arm 67 of a bracket 68 secured to but insulated from the bracket 41. The upper end of the rod 66 is threaded and provided with nuts 69, the under nut being engaged by the upper surface of the bracket arm 67. The rod 66 resets the catch 56 on the latch by the upward movement of the head 23 carrying the brackets 41 and 68 which causes the arm 67 to engage the nuts 69 and raise the rod 66 which carries the lower contact member 48 with it.

The contact members 40 and 48 are brought together and the circuit closed by the downward movement of the head 23 carrying the contact 40 with it, the contact 48 being previously set into its upper position and held by the latch 57. During the downward movement of the head 23 and brackets 41 and 68 the rod 66 remains stationary, the arm 67 sliding freely thereon. When the slide 13 has traveled downward the desired extent the finger 63 trips the latch 57 and the contact 48 is drawn abruptly away from the contact 40 by the spring 61, the rod 66 traveling down with it. On the return upward movement of the head 23 and slide 13, the contact 40 rises with the head 23, the finger 63 releases the latch 57 and the lower contact 48 is reset in its upper position by the bracket arm 67 carrying the rod 66 up by means of the nuts 69 and against the action of the spring 61. During the upward travel of the contact 48, the inclined surface of the catch 56 forces the latch 57 over against the action of the spring 59 and when the catch has been raised above the ledge or shoulder on the latch, the spring 59 causes the latch to spring under the catch and the contact 48 is held in its uppermost position, but not in engagement with the contact 40 which has also been rising with the head 23. It will be here noted that the circuit is both established and broken on the downward movement of the slide 13 and the contact 48 is reset on the return movement of the slide.

The operation of the machine is as follows: the work 70 in the case illustrated consisting of two intersecting pieces, one or both of which are provided with projecting ridges or points to establish the ready flow of current, being supported upon the lower work-engaging contact 12 secured to the electrode 6. At the beginning of the cycle of operations the parts are in the positions shown in Figs. 1 and 6, the contacts 40 and 48 being separated and therefore the circuit broken and the electrode slide 13 and the head 23 being in their uppermost position. At this time the springs 31 have a certain initial tension and the switch contact 48 has been reset and held by the latch 57. Power is applied to the head 23 either by the admission of fluid to the cylinder 17 or otherwise which causes the head to descend and also the slide 13. The contact 14 of the slide 13 engages the work 17 and at about the same instant or a trifle thereafter the contact 40, descending with the head 23, engages the contact 48 and the current starts to flow from the electrode 13 to the electrode 6 through the work engaging contacts 14 and 12 and the work 70, the positions taken by the various devices at this stage of the operation being indicated in Fig. 7. The slide 13 meeting resistance in the still comparatively cool metal of the work remains substantially stationary and the head 23 continues to travel downward and thereby further compressing the springs 31, the head sliding freely on the rods 27 and 28 and the switch contacts remaining in engagement, the additional movement of the head causing the contact 40 to back up in the arm 45 and compress the spring 42. The current continuing to flow, the work softens and is pressed together by the pressure of the springs 31 until the head has traveled down sufficiently far to bring the lug or projection 33 down on the nut 34 owing to the much greater movement of the head under direct pressure from the cylinder or other source than the movement given the slide 13 on softening of the work under the gradual pressure of the springs 31. The positions of the parts taken at this time are shown in Fig. 8, the tripping finger 63 being just about to engage the pin 65 of the latch 57. Further movement given the head 23 applies the power from the cylinder 17 or other source direct to the slide 13 through the lug 33 and cuts out the springs 31 which at this stage are negligible. This action causes a sharp heavy pressure to be applied suddenly to the work 70 to give it the final upsetting and welding pressure to jam the pieces of metal together, in the meantime the tripping finger 65 having turned the latch 57, the catch 56 is freed and the contact 48 is drawn sharply away from the contact 40 by the spring 61 and thus breaking the circuit and stopping the flow of heating current. The positions taken by the various operative parts of the machine at this stage where the circuit has been broken and the final upsetting pressure applied are shown in Fig. 9. On actuating the piston in the cylinder 17 in the reverse direction or by the continued rotation of the shaft 38 of Fig. 10 the head 23 first slides upward on the rods 27, 28 and the extreme compression of the springs 31 is relieved, the lug 33 leaving the nut 34 of the slide 13. The head 23 rising strikes the collars 30 of the rods 27, 28 and thereafter raises the slide 13 by means of said rods. The upward travel of the slide 13 causes the finger 65 to free the latch 57 which is then drawn back in the direction of the catch 56 by spring 59. The upward travel of the head 23 carrying the brackets 41 and 68 causes the arm 67 to engage the nuts 69 and raise the contact 48 to such position that the catch 56 springs over the shoulder on the latch 57 and the cycle of operations is complete.

Instead of applying the final heavy upsetting pressure as a rigid unyielding pressure it may be applied through a very heavy spring as shown in Fig. 11. In this case the initial pressure springs 31 act as heretofore and the projection or lug 33 of the head 23 is preferably provided with an adjustable nut 80 which on the downward movement of the head 23 engages a head or projection 81 secured to the top of the slide 13. The head 81 however is not rigidly fastened to the slide 13 but is slidably mounted therein. A heavy spring 82 of great power as compared to the springs 31 is interposed between the head 80 and the top of the slide 13. When the head 81 and projection 80 engage on the downward movement of the head 23 at a time corresponding to when the lug 33 engages the head in the previous case, the spring 82 is compressed and being very heavy applies an enormous pressure to the work at the predetermined time as in the prior case where an unyielding connection between the head and slide is effected. The head or projection 81 is slidably secured to the slide 13 in any suitable manner as by providing it with a threaded shank 84 on which is a nut 85. The nut 85 works in a casing 86 secured to but insulated from the slide 13, the nut engaging the top of the casing 86 and forms a stop for the head to hold it to the slide when the spring 82 is freed from the influence of the head 23. By rotating the head 81 the time of application of power by the head 23 may be adjusted. In some classes of work it is desirable to apply a yielding pressure at all times and by the last described arrangement such yielding pressure is maintained and still the simulation of hand welding is adhered to.

It will be understood that the invention is not limited to the exact details of construction and the arrangement of parts shown and described, such being for the purpose of illustration only, but various modifications may be resorted to without departing from the spirit of the invention as set forth in the appended claims.

What I claim as my invention is:—

1. In an electric metal working apparatus, the combination of an electrode, actuating mechanism therefor, a spring for applying upsetting pressure to the work, and means for applying upsetting pressure by said actuating mechanism to said electrode first through said spring and then independently of said spring as and for the purpose described.

2. In an electric metal working apparatus, the combination of an electrode actuating mechanism therefor, springs for applying upsetting pressure to the work through which upsetting pressure by said actuating mechanism is applied to said electrode and devices acting independently of said springs for subsequently applying an increased upsetting pressure to said electrode as and for the purpose described.

3. In an electric metal working apparatus, the combination of means for supplying a heating current to the work, actuating mechanism, springs through which upsetting pressure by said mechanism is applied to said heating means during one stage of operations and a device acting independently of said springs for applying increased upsetting pressure to said heating means at a subsequent stage of the operations, as and for the purpose described.

4. In an electric metal working apparatus, the combination of an electrode, actuating mechanism, springs through which normal upsetting pressure by said mechanism is applied to said electrode and means for subsequently applying upsetting pressure by said mechanism to the work independently of said springs.

5. In an electric metal working apparatus, the combination of an electrode, actuating mechanism and means for first applying a yielding upsetting pressure to the work through said electrode and subsequently applying a rigid pressure thereto.

6. In an electric metal working apparatus, the combination of means for supplying a heating current to the work, means for applying a yielding mechanical upsetting pressure to the heated section of the work and mechanism for applying an unyielding upsetting pressure to said heating means after the work has softened a predetermined amount.

7. In an electric metal working apparatus, the combination of actuating mechanism by which upsetting pressure is applied to the work, springs for applying upsetting pressure to the work interposed between said actuating mechanism and the work and through which upsetting pressure is first applied and means for applying pressure from said actuating mechanism directly to the work after said springs have acted.

8. In an electric metal working apparatus, the combination of means for applying a normal upsetting pressure to the work through springs and mechanism for subsequently applying an increased pressure to the work independently of said springs as and for the purpose described.

9. In an electric metal working apparatus, the combination of a work engaging element, actuating mechanism therefor, springs through which upsetting pressure is first applied to said element and means independent of said springs for subsequently applying an increased pressure not through said springs to said element as and for the purpose described.

10. In an electric metal working apparatus, the combination of a work engaging element, a head movable independently of said element, actuating mechanism for said head, springs through which upsetting pressure from said head is first applied to said element and mechanism adapted to subsequently cause said head to apply an increased pressure to said element independently of said springs.

11. In an electric metal working apparatus, the combination of a work engaging element, a head movable independently of said element, actuating mechanism, springs through which upsetting pressure is first applied to said element and adjustable means adapted to subsequently cause said head to apply an increased pressure to said element independently of said springs.

12. In an electric metal working apparatus, the combination of a work engaging element, actuating mechanism, a spring for applying upsetting pressure to the work and means for first applying upsetting pressure by said actuating mechanism to said element through said spring and then applying an increased pressure to said element independently of said spring, the time of application of said increased pressure being adjustable as and for the purpose described.

13. In an electric metal working apparatus, the combination of a work engaging element, actuating mechanism, means for applying a yielding upsetting pressure to said element and means for applying direct rigid pressure to said element after said yielding pressure has operated.

14. In an electric metal working apparatus, the combination of a work engaging element, a head capable of movement toward said element independently thereof, actuating mechanism, springs interposed between said head and said element through which upsetting pressure from said mechanism is applied to said element and mechanism adapted to apply pressure by said actuating mechanism directly from said head to said element.

15. In an electric metal working apparatus, the combination of a work engaging element, a head capable of independent movement toward said element, actuating mechanism for applying pressure to said head, springs through which upsetting pressure is applied to the work through said element and means adapted to apply a direct pressure to the work from said head and through said element after the pressure has been applied through the springs as and for the purpose described.

16. In an electric metal working apparatus, the combination of a work engaging element through which pressure is applied to the work, a head movable independently of said element, actuating mechanism for the head, a yielding upsetting pressure device between said head and said element for applying upsetting pressure to the work, and means for establishing a rigid connection between said head and said element as and for the purpose described.

17. In an electric metal working apparatus, the combination of a work engaging slide and actuating mechanism therefor, said mechanism including a yielding pressure device adapted to apply an upsetting pressure to said slide and means for establishing a rigid pressure connection with said slide after the yielding pressure device has operated.

18. In an electric metal working apparatus, the combination of a work engaging slide, a head movable independently of said slide, actuating mechanism for the head, a pair of springs between said head and said slide and adapted to apply a yielding upsetting pressure to the work and a projection on said head between said springs and adapted to engage said slide to apply pressure directly from said head to said slide as and for the purpose described.

19. In an electric metal working apparatus, the combination of a work engaging slide, a head movable independently thereof, actuating mechanism for the head, a yielding upsetting pressure device between said head and the slide and adapted to upset the heated section of the work, and means adapted to establish a rigid direct pressure connection between the head and slide after the yielding pressure has been applied to the work.

20. In an electric metal working apparatus, the combination of a work engaging slide, a head movable independently thereof, actuating mechanism for the head, a yielding upsetting pressure device between said head and the slide and adjustable means adapted to establish a rigid direct pressure connection between the head and slide after the yielding pressure has been applied to the work.

21. In an electric metal working apparatus, the combination of a work engaging slide, a head movable independently thereof, actuating mechanism connected to said head, a pair of springs interposed between said head and slide and adapted to apply a yielding upsetting pressure to the slide to upset the heated section of the work and means carried by said head and adapted to engage the slide to apply a direct rigid pressure thereto.

22. In an electric metal working apparatus, the combination of actuating mechanism, a work engaging pressure slide, a head, springs interposed between the head and the slide and adapted to apply the initial upsetting pressure to the heated work and a device between said head and said slide and adapted to subsequently apply pressure to said slide independently of said springs.

23. In an electric metal working apparatus, the combination of a work-engaging slide adapted to feed current to the work, a circuit controller closed by the movement of said slide, means actuated by said slide and adapted to open said controller and means operated by said slide for resetting said controller.

24. In an electric metal working apparatus, the combination of an electrode for supplying heating current to the work, a circuit controller operated thereby to start the flow of current, a trip actuated by said electrode to break said controller and means operated by said electrode for resetting said controller.

25. In an electric metal working apparatus, the combination of a work engaging slide adapted to feed current to the work, a circuit controller closed by the movement of the slide in one direction, means controlled by said slide and adapted to open said controller on the continued movement of the slide in the same direction and means for resetting said controller on the return movement of the slide.

26. In an electric metal working apparatus, the combination of a slide adapted to apply pressure to the work, a circuit controller closed by the operation of said slide, means for breaking said controller and means for resetting said controller, both said means being actuated by the movement of the slide.

27. In an electric metal working apparatus, the combination of a work engaging slide, a current controller comprising contacts movable into and out of engaging position, a latch adapted to hold one of said contacts in position, a trip actuated by said slide for freeing said contact to break the circuit and means operated by the movement of said slide for resetting said contact.

28. In an electric metal working apparatus, the combination of a work engaging slide, a current controller comprising contacts movable into and out of engaging position, means adapted to hold one of said contacts in set position, an adjustable trip carried by said slide for freeing said contact to break the circuit and means operated by the return movement of the slide for resetting said contact.

29. In an electric metal working apparatus, the combination of a work engaging slide, a circuit controller comprising contacts movable into and out of engaging position, a pivoted latch for holding one of said contacts in set position, a trip actuated by the movement of the slide in one direction to free said contact to break the circuit and a rod actuated by the return movement of the slide to reset said contact.

30. In an electric metal working apparatus, the combination of a work engaging slide and a circuit controller comprising a pair of contacts adapted to engage each other, one of said contacts being adapted to make the circuit and the other being adapted to break the circuit.

31. In an electric metal working apparatus, the combination of a work engaging slide, a circuit controller comprising two contacts adapted to engage each other to control the flow of heating current through the work, means for causing one of said contacts to move toward the other to make the circuit and means actuated by said slide to cause the other contact to move away from the first named contact to break the circuit.

32. In an electric metal working apparatus, the combination of a work engaging slide, a circuit controller comprising a pair of contacts adapted to engage each other, means adapted to cause one of said contacts to make the circuit on movement of said slide in one direction and means adapted to cause the other contact to break the circuit on movement of said slide in the same direction.

33. In an electric metal working apparatus, the combination of a work engaging slide, a head movable independently thereof, actuating mechanism for said head, a pair of springs interposed between said head and slide and adapted to apply a yielding upsetting pressure to the slide and a lug carried by the head and located between said springs and adapted to engage the slide to apply a direct pressure thereto.

34. In an electric metal working apparatus, the combination of a work engaging slide, a head movable independently thereof, actuating mechanism for said head, a pair of springs interposed between said head and slide and adapted to apply a yielding upsetting pressure to the slide, a lug secured to said head and disposed between said springs and an adjustable seat carried by said slide and adapted to be engaged by said lug to apply a direct rigid pressure from said head to said slide.

35. In an electric metal working apparatus, a circuit controller, a work engaging element, operating means for applying pressure to said element and adapted to close said controller, a spring through which said operating mechanism applies pressure to said element and means acting independently of said spring and adapted to apply a rigid pressure between said operating means and said element, said circuit controller being automatically opened on the continued movement of said operating means in the same direction.

36. In an electric metal working apparatus, a work engaging element, a circuit controller, operating means for applying pressure to said element and adapted to set said controller in closed position, a yielding pressure device between said operating means and said element and a rigid pressure device acting between said means and said element subsequent to said yielding device, said circuit controller being automatically opened on the continued movement of said operating means in the same direction.

37. In an electric metal working apparatus, the combination of a work engaging element, a circuit controller, operating means for applying pressure to said element and adapted to close said controller on a movement in one direction, a yielding pressure device between said operating means and said element, a rigid pressure device acting between said means and said element subsequent to said yielding device, said circuit controller being automatically opened on the continued movement of said operating means in the same direction.

38. In an electric metal working apparatus, the combination of a work engaging element adapted to feed current to the work, operating means for said element, a circuit controller closed by the movement of said means in one direction and means operated during the continued movement of said operating means in the same direction to automatically open said controller.

39. In an electric welding apparatus, the combination of relatively movable dies for engaging the work, a circuit controller in circuit with said dies, mechanism automatically operable to close said controller upon the application of a predetermined force on the movable die and means adapted to open the controller on the application of an increased operating pressure on said die.

40. In an electric welding machine, the combination of a set of relatively movable welding dies, a circuit controller in circuit with said dies, means movable to apply pressure between said dies and mechanism carried by said means and operable by a pressure applying movement of said means to close said controller.

Signed at Westerly, in the county of Washington and State of Rhode Island this 26th day of August, A. D. 1911.

ADOLPH F. RIETZEL.

Witnesses:
MAE G. BABCOCK,
CHAS. W. RIETZEL.